July 28, 1942.  O. W. LIVINGSTON  2,291,342
ELECTRIC VALVE CIRCUIT
Filed July 23, 1941

Inventor:
Orrin W. Livingston,
by *Harry E. Dunham*
His Attorney.

Patented July 28, 1942

2,291,342

UNITED STATES PATENT OFFICE 2,291,342

ELECTRIC VALVE CIRCUIT

Orrin W. Livingston, Scotia, N. Y., assignor to General Electric Company, a corporation of New York Application July 23, 1941, Serial No. 403,611

20 Claims. (Cl. 171—242)

My invention relates to electric valve systems and more particularly to control or protective systems for electric valve translating apparatus for energizing a load circuit from an alternating current supply circuit.

Where electric valve apparatus is employed to energize a load circuit, as for example in systems where electric valve equipment is employed to maintain an electrical condition such as the voltage of a load circuit at a predetermined value, it is frequently important to provide in the system means for assuring protection of the apparatus in the event any one of the associated control elements becomes defective. In accordance with the teachings of my invention described hereinafter, I provide a new and improved system for protecting the electric valve apparatus in the event an associated part of the system or circuit fails.

It is an object of my invention to provide a new and improved electric valve translating apparatus.

It is another object of my invention to provide a new and improved control system for electric valve translating apparatus.

It is a further object of my invention to provide a new and improved control or protective system for electric valve means of the type employing an ionizable medium such as a gas or a vapor.

Briefly stated, in the illustrated embodiments of my invention I provide a protective system for electric valve means employed in a translating circuit for controlling an electrical condition, such as the voltage, of an associated load circuit. An excitation circuit controls the conductivity of the electric valve means by impressing on the control member or grid thereof a resultant voltage, the magnitude of which determines the magnitude of the electrical condition. I provide means for impressing on the control member a suitable voltage which substantially reduces the conductivity of the electric valve means, or renders the electric valve means completely nonconductive in the event the excitation circuit fails, or becomes inoperative, so that the electric valve means and the associated equipment are protected.

Figure 1:
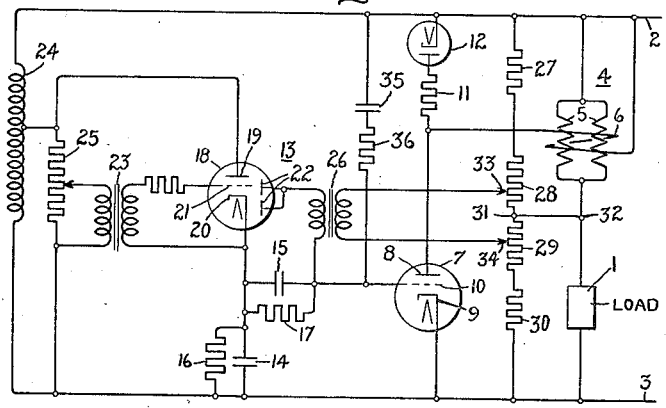
Figure 2:
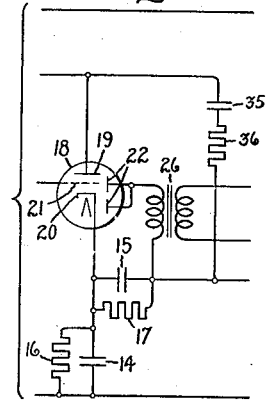
Figure 3:
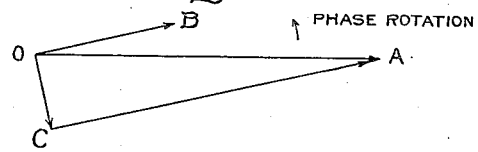
Figure 4:
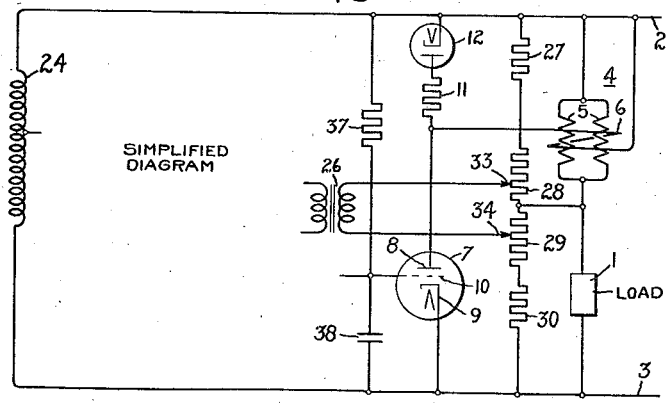
Figure 5:
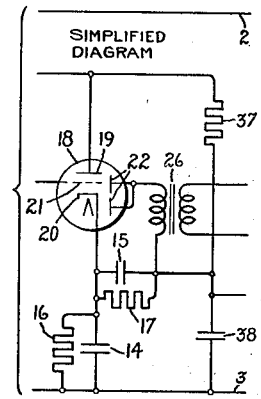

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to a system for energizing a load circuit from a single phase alternating current supply circuit, and Fig. 2 is a modification of the arrangement shown in Fig. 1. Fig. 3 is a vector diagram representing certain operating characteristics of the circuit arrangements of Figs. 1 and 2. Figs. 4 and 5 are simplified circuit diagrams of the arrangements shown in Figs. 1 and 2, respectively.

Referring now to Fig. 1, I have there chosen to represent my invention as applied to a system for maintaining an electrical condition, such as the voltage applied to a load circuit 1 at a substantially constant value. The system may be energized from a suitable source of alternating current comprising conductors 2 and 3. The load circuit 1 is energized through electric translating apparatus comprising control means, such as a saturable inductive device 4 including windings 5, the inductive reactance thereof controlling the voltage which is impressed across the load circuit. The saturable inductive device 4 is also provided with a control winding 6 which is energized by variable amounts of unidirectional current and which accordingly controls the magnetization of the inductive device 4 thereby controlling the voltage drop across windings 5. The translating system also may comprise an electric valve means 7 which may be of the type comprising an ionizable medium, such as a gas or a vapor, and which includes an anode 8, a cathode 9 and a control member or control grid 10. The electric valve means 7 may be of the type requiring the impression of a negative voltage on the grid 10 during the positive half cycles of applied anode-cathode voltage in order to maintain the electric valve means in a non-conducting condition. That is, the electric valve means 7 may be of the type having a negative grid-control characteristic. The electric valve means 7 is connected in circuit with control winding 6 and transmits variable amounts of unidirectional current from the supply circuit through winding 6. I may also connect across the winding 6 a serially connected resistance 11 and a unidirectional conducting device 12 which is poled to permit the flow of current which is due to the stored electromagnetic energy of winding 6, and which tends to flow during the negative half-cycles.

I employ an excitation circuit 13 for controlling the conductivity of the electric valve means 7 in response to a predetermined electrical condition, such as the voltage of the load circuit 1. The excitation circuit 13 may comprise a pair of serially connected capacitances 14 and 15 which are connected in circuit with the grid 10 of electric valve means 7, and which impress thereon a resultant voltage which determines the amount of current transmitted to winding 6 and, hence, determines the magnitude of the voltage applied to load circuit 1. Discharge resistances 16 and 17 may be connected across the capacitances 14 and 15, respectively.

Capacitance 14 produces a positive or turn-on voltage tending to increase the amount of current transmitted to winding 6, and which consequently tends to increase the magnitude of the voltage impressed across the load circuit. Capacitance 15 produces an opposing voltage, that is a negative or turn-off voltage, the magnitude of which varies in response to the voltage of the load circuit. The relative magnitudes of the positive turn-on and the negative turn-off voltages determine the conductivity of the electric valve means 7.

I also provide in excitation circuit 13 an electric discharge device 18 including one electric discharge path provided by an anode 19 and a cathode 20, the conductivity of which is controlled by means of a grid 21. The electric discharge device 18 also includes a second electric discharge path provided by anodes 22 and cathode 20. The first discharge path controls the amount of current transmitted to capacitance 14 and resistance 16 and, hence, determines the magnitude of the positive turn-on voltage. The conductivity of the discharge path provided by anode 19 and cathode 20 may be controlled in response to the magnitude of the supply voltage through apparatus including a transformer 23, an auto-transformer 24 and an interconnecting voltage divider 25. A current limiting resistance may be connected in series with the grid 21, if desired. The magnitude of the negative turn-off voltage varies in response to the voltage of the load circuit, and the amount of current transmitted to capacitance 15 and resistance 17 may be controlled by varying the voltage impressed across anodes 22 and cathode 20. For example, a transformer 26 may be energized in response to the voltage of the load circuit. I provide a voltage divider connected across the supply circuit and including resistances 27, 28, 29 and 30 having a terminal 31 connected to the common juncture 32 of the saturable inductive device 4 and the load circuit 1. Resistances 28 and 29 may be provided with adjustable contacts 33 and 34, respectively. The resistances of the voltage divider and the contacts 33 and 34 are adjusted so that the voltage supplied to transformer 26 varies principally in response to the voltage appearing across the load circuit 1 so that the turn-off voltage varies in response to the voltage of the load circuit.

As a means for protecting the electric valve means 7 and the associated equipment in the event the excitation circuit 13 fails, or in the event the electric discharge device 18 fails or becomes inoperative, I provide apparatus which may include a serially connected capacitance 35 and a resistance 36 connected between one terminal of the alternating current supply circuit, such as conductor 2, and the control grid 10 of electric valve means 7. These impedance elements cooperating with the other elements of the excitation circuit 13, principally capacitance 15, impress on control grid 10 an alternating component of voltage displaced in phase with respect to the anode-cathode voltage applied to electric valve means 7 by an angle sufficient to reduce substantially or to maintain completely non-conducting the electric valve means 7 in the event the excitation circuit 13 fails. For example, I have found that satisfactory protection of the system is afforded if the alternating component of voltage impressed on the grid 10 is displaced substantially ninety electrical degrees lagging the anode-cathode voltage. The alternating component of voltage also produces a negative unidirectional bias voltage due to the grid rectification characteristic of the electric valve means. That is, upon failure of the system to produce the positive negative turn-on and turn-off voltages, the circuit including the capacitance 35 and capacitance 15 produces negative biasing voltages to retard the phase of the resultant grid voltage impressed on grid 10 to substantially the 180 electrical degree lagging phase displacement region.

The operation of the embodiment of my invention shown in Fig. 1 will be explained by considering the system when it is operating to maintain the voltage supplied to the load circuit 1 at a substantially constant value. The voltage impressed across the load circuit 1 is, of course, determined by the voltage of the supply circuit and the voltage drop across windings 5 of saturable inductive device 4. As the magnetization of the device 4 is increased by transmitting increased amounts of current through winding 6, it will be understood that the inductive reactance of windings 5 will be decreased and consequently the voltage drop across windings 5 will be correspondingly decreased, effecting a rise in voltage across the load circuit. Conversely, the voltage across the load circuit may be lowered by decreasing the amount of current transmitted through control winding 6.

Variable amounts of unidirectional current are transmitted through control winding 6 by electric valve means 7, which is controlled conjointly in response to the voltage of the supply circuit and the voltage appearing across the load circuit. As stated above, the control may be made responsive primarily to the voltage of the load circuit by the adjustment of contacts 33 and 34. The positive turn-on voltage produced by capacitance 14 and resistance 16 tends to increase the current conducted by electric valve means 7 and consequently tends to increase the voltage impressed across the load circuit. The negative turn-off voltage produced by capacitance 15 and resistance 17, and which varies in magnitude principally in response to the voltage of the load circuit, tends to decrease the conductivity of the electric valve means 7. The voltage of the load circuit is maintained constant by the resultant of the positive turn-on voltage and negative turn-off voltages.

It will be appreciated that in the absence of the additional control or protective means which I provide, if the excitation circuit 13 becomes inoperative or fails for any reason, the electric valve means 7, if it is designed to have a negative grid control characteristic, will conduct a large amount of current effecting substantial saturation of the inductive device 4 and consequently effect the application of an excessive voltage to the load circuit 1. The capacitance 35 and resistance 36, acting in conjunction with capacitance 14, serve to limit the conductivity of the electric valve means 7 in the event of failure of the excitation circuit, or serve to render completely nonconducting the electric valve means 7 in the event of such failure. The capacitance 35 and resistance 36, acting in conjunction with capacitance 14, produce an alternating component of voltage and impress this voltage on grid 10. This alternating component of voltage is of such magnitude and phase displacement and cooperates with the incident negative bias voltage to limit the current conducted by electric valve means 7.

The operation of circuit of Fig. 1 may be more fully appreciated by referring to Fig. 3 where vector OA represents the voltage of the alternating current supply circuit and, of course, may represent the voltage applied to the anode-cathode circuit of electric valve means 7. Vector OB represents the current conducted by the circuit including capacitance 35, resistance 36 and capacitance 14. Vector OC represents the voltage drop appearing across the capacitive elements in the protective circuit, and the magnitude of this vector is determined principally by capacitance 14. Vector CA represents the principal resistive voltage drop appearing across resistance 36. It will be appreciated, of course, that during normal operation of the electric valve means, these voltages are present in addition to the positive turn-on voltage and the negative turn-off voltage. In the event the electric discharge device 18 becomes inoperative rendering the turn-off voltage ineffective, the voltage OC is impressed between cathode 9 and grid 10, serving to render the electric valve means 7 nonconducting. It is to be understood that the voltage produced by the circuit including capacitance 35 also produces an additional voltage which is the negative bias voltage due to the grid rectification characteristic of electric valve means 7. A similar bias voltage is also produced by capacitance 15 and these voltages cooperating with the 90 electrical degrees displaced alternating component of voltage produce a resultant grid voltage displaced substantially 180 electrical degrees with respect to the voltage of the supply circuit. In this manner, the conductivity of the electric valve means 7 is reduced to substantially zero.

Fig. 2 diagrammatically represents a modification of the arrangement shown in Fig. 1. Instead of connecting the capacitance 35 and the resistance 36 to one terminal, such as conductor 2 of the supply circuit, the capacitance 35 may be connected to the anode 19 of the electric discharge device 18. The arrangement of Fig. 2 operates in substantially the same manner as that described above in connection with Fig. 1.

In order to simplify the presentation of the manner in which the protective systems of Figs. 1 and 2 operate, Figs. 4 and 5 present in simplified form the equivalent circuit diagrams of Figs. 1 and 2, respectively. The protective circuit for the electric valve means 7 may be represented by an equivalent resistance 37 and an equivalent capacitance 38. The value of the equivalent resistance 37 is determined principally by the value of resistance 36, and the value of the equivalent capacitance 38 is determined principally by the value of capacitance 14.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, means connected between said supply circuit and said load circuit for controlling an electrical condition of said load circuit and comprising electric valve means provided with a control member, said electric valve means being of the type requiring the impression of a predetermined negative voltage on said control member during the positive half cycle of applied anode-cathode voltage in order to maintain the electric valve means nonconducting, an excitation circuit comprising means for impressing on said control member a voltage tending to increase the magnitude of said electrical condition, and means for impressing on said control member a phase displaced alternating voltage sufficient to maintain said electric valve means nonconducting in the event said excitation circuit fails.

2. In combination, a supply circuit, a load circuit, means connected between said supply circuit and said load circuit for controlling an electrical condition of said load circuit and comprising electric valve means provided with a control member, an excitation circuit comprising means for impressing on said control member a voltage tending to increase the magnitude of said electrical condition, and means for substantially reducing the conductivity of said electric valve means in the event said excitation circuit fails and comprising means for impressing on said control member a voltage of sufficient magnitude to maintain said electric valve means nonconducting.

3. In combination, an alternating current supply circuit, a load circuit, means connected between said supply circuit and said load circuit for controlling an electrical condition of said load circuit and comprising an electric valve means provided with an anode, a cathode and a grid, said electric valve means being of the type which requires the impression of a negative hold-off voltage on said grid during the positive half cycles of anode-cathode voltage in order to maintain said electric valve means nonconducting, an excitation circuit comprising means for impressing on said grid a positive turn-on voltage, and means for impressing on said grid an alternating voltage of a magnitude and phase displacement sufficient to maintain said electric valve means nonconducting in the event said excitation circuit fails.

4. In combination, an alternating current supply circuit, a load circuit, means connected between said supply circuit and said load circuit for controlling an electrical condition of said load circuit and comprising electric valve means provided with an anode, a cathode and a grid, said electric valve means being of the type requiring the impression of a negative hold-off voltage on said grid during the positive half cycles of anode-cathode voltage in order to maintain said electric valve means nonconducting, an excitation circuit comprising means for impressing on said control member a positive turn-on voltage and a negative turn-off voltage the relative magnitudes of which determine the magnitude of said electrical condition, and means for impressing on said grid an alternating voltage of a magnitude and phase displacement to maintain said electric valve means nonconducting in the event said excitation circuit fails.

5. In combination, an alternating current supply circuit, a load circuit, means connected between said supply circuit and said load circuit for controlling an electrical condition of said load circuit and comprising electric valve means provided with a control member, an excitation circuit comprising means including an electric discharge device for impressing on said control member a voltage tending to increase the magnitude of said electrical condition, and means for substantially reducing the conductivity of said electric valve means in the event said excitation circuit fails.

6. In combination, an alternating current supply circuit, a load circuit, means connected between said supply circuit and said load circuit for controlling an electrical condition of said load circuit and comprising an electric valve means provided with a control member, an excitation circuit comprising means including an electric discharge device for impressing on said control member a turn-on voltage and a turn-off voltage the relative magnitudes of which determine the magnitude of said electrical condition, and means for rendering said electric valve means substantially nonconducting in the event said excitation circuit fails.

7. In combination, an alternating current supply circuit, a load circuit, means connected between said supply circuit and said load circuit for controlling an electrical condition of said load circuit and comprising electric valve means provided with a control member, an excitation circuit comprising means including an electric discharge device for impressing on said control member a turn-on voltage and a turn-off voltage the relative values of which determine the magnitude of said electrical condition, and means for substantially reducing the conductivity of said electric valve means in the event said electric discharge device becomes inoperative.

8. In combination, an alternating current supply circuit, a load circuit, means connected between said supply circuit and said load circuit for controlling an electrical condition of said load circuit and comprising an electric valve means provided with a grid, an excitation circuit comprising means including an electric discharge device for impressing on said grid a positive turn-on voltage and a negative turn-off voltage the relative magnitudes of which determine the magnitude of said electrical condition, and means for reducing substantially the conductivity of said electric valve means in the event said excitation circuit becomes inoperative and comprising means for impressing on said grid an alternating component of voltage which lags the voltage of said supply circuit by an appreciable angle.

9. In combination, an alternating current supply circuit, a load circuit, means connected between said supply circuit and said load circuit for controlling an electrical condition of said load circuit and comprising an electric valve means provided with a grid, an excitation circuit comprising means including an electric discharge device for impressing on said grid a positive turn-on voltage and a negative turn-off voltage the relative magnitudes of which determine the magnitude of said electrical condition, means for controlling the conductivity of said electric discharge device, and means for substantially reducing the conductivity of said electric valve means in the event said excitation circuit becomes inoperative.

10. In combination, an alternating current supply circuit, a load circuit, means connected between said supply circuit and said load circuit for controlling an electrical condition of said load circuit and comprising an electric valve means provided with a grid, an excitation circuit connected to said grid for controlling the conductivity of said electric valve means and comprising a pair of capacitances connected in circuit with said grid, an electric discharge means for charging said capacitances in opposite directions relative to said grid for impressing thereon a positive turn-on voltage and a negative turn-off voltage the relative magnitudes of which determine the conductivity of said electric valve means, and means for impressing on said grid an alternating component of voltage which lags the voltage of said supply circuit for maintaining said electric valve means nonconducting in the event said excitation circuit fails.

11. In combination, an alternating current supply circuit, a load circuit, means connected between said supply circuit and said load circuit for controlling an electrical condition of said load circuit and comprising an electric valve means provided with a grid, an excitation circuit connected to said grid and comprising a pair of serially connected capacitances connected in circuit with said grid, an electric discharge device for charging said capacitances in opposite directions relative to said grid for impressing thereon a turn-on voltage and a turn-off voltage the relative magnitudes of which control the conductivity of said electric valve means and means for controlling the conductivity of said electric discharge device, and means including a serially connected capacitance and a resistance connected between said grid and one terminal of said alternating current circuit for impressing on said grid an alternating component of voltage sufficient in magnitude to maintain said electric valve means nonconducting in the event said excitation circuit fails.

12. In combination, an alternating current supply circuit, a load circuit, means connected between said supply circuit and said load circuit for controlling an electrical condition of said load circuit and comprising an electric valve means provided with a grid, an excitation circuit connected to said grid and comprising a pair of serially connected capacitances connected in circuit with said grid, an electric discharge device for charging said capacitances in opposite directions relative to said grid for impressing thereon a turn-on voltage and a turn-off voltage the relative magnitudes of which control the conductivity of said electric valve means and means for controlling the conductivity of said electric discharge device conjointly in response to the voltage of said supply circuit and said electrical condition, and means including a serially connected capacitance and a resistance connected between said grid and one terminal of said alternating current circuit for impressing on said grid an alternating voltage sufficient in magnitude to maintain said electric valve means nonconducting in the event said excitation circuit fails.

13. In combination, an alternating current supply circuit, a load circuit, means connected between said supply circuit and said load circuit for controlling an electrical condition of said load circuit and comprising an electric valve means provided with a grid, an excitation circuit connected to said grid and comprising a pair of serially connected capacitances connected in circuit with said grid, an electric discharge device for charging said capacitances in opposite directions relative to said grid for impressing thereon a turn-on voltage and a turn-off voltage the relative magnitudes of which control the conductivity of said electric valve means and means for controlling the conductivity of said electric discharge device, and means including a serially connected capacitance and a resistance connected between said grid and said electric discharge device for impressing on said grid an alternating voltage which lags the voltage of said supply circuit for maintaining said electric valve means nonconducting in the event said excitation circuit fails.

14. In combination, an alternating current supply circuit, a load circuit, means connected between said supply circuit and said load circuit for controlling an electrical condition of said load circuit and comprising an electric valve means provided with a grid, an excitation circuit for impressing on said grid a positive turn-on voltage and means responsive to said electrical condition for impressing on said grid a negative turn-off voltage, and means for reducing substantially the conductivity of said electric valve means in the event said excitation circuit becomes inoperative and comprising a serially connected capacitance and a resistance connected to said supply circuit for impressing on said grid a resultant alternating voltage lagging the voltage of said supply circuit by substantially 180 electrical degrees.

15. In combination, an alternating current supply circuit, a load circuit, electric translating apparatus connected between said supply circuit and said load circuit and comprising control means having a control winding, means for controlling said control winding and comprising an electric valve means provided with a control member, an excitation circuit for energizing said control member and comprising means for impressing thereon a voltage tending to render said electric valve means conducting and means energized in response to an electrical condition for impressing on said control member a voltage in opposition to the first mentioned voltage, and protective means for superimposing on said voltages a third voltage sufficient in magnitude to maintain said electric valve means nonconducting in the event said excitation circuit becomes inoperative.

16. In combination, an alternating current supply circuit, a load circuit, electric translating apparatus connected between said supply circuit and said load circuit for controlling an electrical condition of said load circuit and comprising control means provided with a control winding, means for variably energizing said control winding comprising an electric valve means provided with a control member, an excitation circuit comprising means for impressing on said control member a positive turn-on voltage and means energized in response to said electrical condition for impressing on said control member a turn-off voltage, and protective means for impressing on said control member resultant alternating voltage displaced substantially 180 electrical degrees relative to the voltage of said supply circuit and of sufficient magnitude to reduce substantially the conductivity of said electric valve means in the event said excitation circuit becomes inoperative.

17. In combination, an alternating current supply circuit, a load circuit, means connected between said supply circuit and said load circuit for controlling an electrical condition of said load circuit comprising a saturable inductive device having a control winding and an electric valve means for variably energizing said control winding, said electric valve means being provided with a control member for controlling the conductivity thereof, an excitation circuit connected to said control member including means for impressing thereon a voltage tending to increase the current conducted by said electric valve means and tending to increase the magnitude of said electrical condition, and means for substantially reducing the conductivity of said electric valve means in the event said excitation circuit fails.

18. In combination, an alternating current supply circuit, a load circuit, electric translating apparatus connected between said supply circuit and said load circuit for controlling an electrical condition of said load circuit and comprising an electric valve means having a control member, and an excitation circuit connected to said control member for controlling the conductivity of said electric valve means and comprising an electric discharge device providing two electric discharge paths one of which includes an anode, a cathode and a control grid and the other of which includes a second anode and said cathode, means for energizing the first mentioned discharge path from said supply circuit, means for impressing between said cathode and said grid a voltage which varies in accordance with the voltage of said supply circuit and means for impressing between said second anode and said cathode a voltage which varies in accordance with said electrical condition.

19. In combination, an alternating current supply circuit, a load circuit, electric translating apparatus connected between said supply circuit and said load circuit for controlling an electrical condition of said load circuit and comprising an electric valve means having a control member, an excitation circuit connected to said control member for controlling the conductivity of said electric valve means and comprising a pair of serially connected capacitances for producing opposing voltages the resultant of which determines the amount of current transmitted by said electric valve means, an electric discharge device providing two electric discharge paths one of which includes an anode, a cathode and a control grid and the other of which includes a second anode and said cathode, the first discharge path being connected to one of said capacitances and the second discharge path being connected to the other of said capacitances, means for energizing the first discharge path from said supply circuit, means for impressing on said grid a voltage which varies in accordance with the voltage of said supply circuit, and means for impressing across said second anode and said cathode a voltage which varies in accordance with said electrical condition.

20. In combination, a supply circuit, a load circuit, electric translating apparatus connected between said supply circuit and said load circuit for controlling an electrical condition of said load circuit and comprising an electric valve means having a control member, and an excitation circuit connected to said control member for controlling the conductivity of said electric valve means and comprising an electric discharge device provided with two electric discharge paths one of which includes an anode, a cathode and a control grid and the other of which includes a second anode and said cathode, means for energizing the first mentioned discharge path from said supply circuit, means for impressing between said cathode and said grid a voltage which varies in accordance with an electrical condition of said supply circuit and means for impressing between said second anode and said cathode a voltage which varies in accordance with the electrical condition of said load circuit.

ORRIN W. LIVINGSTON.